United States Patent
Ferretti et al.

(10) Patent No.: US 6,938,768 B2
(45) Date of Patent: Sep. 6, 2005

(54) REUSABLE LID WITH DATE INDICATING DEVICE

(75) Inventors: Bruno R. Ferretti, Sandwich, MA (US); Lawrence C. Stanos, Midland, MI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 222 days.

(21) Appl. No.: 10/159,917

(22) Filed: May 31, 2002

(65) Prior Publication Data

US 2003/0015450 A1 Jan. 23, 2003

Related U.S. Application Data

(63) Continuation-in-part of application No. 09/277,270, filed on Mar. 26, 1999, now abandoned.

(51) Int. Cl.[7] .............................................. B65D 85/00
(52) U.S. Cl. ............................... 206/459.1; 206/459.5; 116/307; 215/230
(58) Field of Search ........................ 206/459.1, 459.5; 40/307, 310–312; 116/306, 308, 316, 307; 215/230; 220/212, 796, 805

(56) References Cited

U.S. PATENT DOCUMENTS

| | | |
|---|---|---|
| 169,992 A | 11/1875 | Hawkins |
| 261,131 A | 7/1882 | Bonshire |
| 571,436 A | 11/1896 | Glentworth |
| 2,025,636 A | 12/1935 | Block |
| 2,201,524 A | 5/1940 | Esty |
| 2,305,370 A | 12/1942 | Wissing |
| 2,706,464 A | 4/1955 | North |
| 2,713,845 A | 7/1955 | Silverman |
| 2,739,564 A | 3/1956 | North |
| 3,392,468 A | 7/1968 | Wolf |
| 3,818,858 A | 6/1974 | Kramer et al. |
| 3,974,916 A | 8/1976 | Bartolucci |
| 4,041,628 A | 8/1977 | Sasson |
| 4,182,338 A | * 1/1980 | Stanulis ...................... 606/203 |
| 4,227,613 A | 10/1980 | Seitz |
| 4,619,221 A | 10/1986 | Linstromberg |
| 4,621,670 A | 11/1986 | Yuen |
| 4,662,520 A | 5/1987 | Griffin |
| 4,985,879 A | 1/1991 | Owens |
| 5,082,136 A | 1/1992 | Schumann |
| 5,311,834 A | 5/1994 | Ross |
| 5,358,117 A | 10/1994 | Adams |

(Continued)

*Primary Examiner*—Luan K. Bui

(57) ABSTRACT

Reusable containers and lids with date indicating devices and methods for using the same disclosed, which allow the user to indicate one or more of the following: a date when the contents were stored, a date when the contents should be used, a time when the contents should be used, and a date by which the contents should be disposed. The date indicating device may include a plurality of resettable buttons, each of which may be located atop an individual platform. Both the buttons and the platforms may take on a variety of different shape.

48 Claims, 11 Drawing Sheets

U.S. PATENT DOCUMENTS

| | | | |
|---|---|---|---|
| 5,427,266 A | | 6/1995 | Yun |
| D365,251 S | | 12/1995 | Lo |
| 5,529,179 A | | 6/1996 | Hanson |
| 5,558,227 A | | 9/1996 | Hakamada |
| 5,566,846 A | * | 10/1996 | James ................... 215/230 |
| 5,694,882 A | | 12/1997 | Marshall |
| 5,700,097 A | * | 12/1997 | Kuhlenschmidt ........... 400/487 |
| 5,711,160 A | | 1/1998 | Namisniak et al. |
| 5,712,450 A | * | 1/1998 | Chan et al. ................ 220/241 |
| 5,720,392 A | | 2/1998 | Price |
| 5,745,932 A | * | 5/1998 | Barovetto ..................... 4/498 |
| 5,826,781 A | | 10/1998 | Jensen |
| 5,979,647 A | * | 11/1999 | Han ......................... 206/222 |
| 6,000,159 A | | 12/1999 | Hornung |
| D428,777 S | | 8/2000 | Hayes et al. |
| D439,744 S | | 4/2001 | Ho |
| D440,470 S | | 4/2001 | Tucker et al. |
| D440,830 S | | 4/2001 | Tucker et al. |
| D443,184 S | | 6/2001 | Maxwell et al. |
| D443,484 S | | 6/2001 | Maxwell et al. |
| D443,798 S | | 6/2001 | Tucker et al. |
| D445,649 S | | 7/2001 | Maxwell et al. |
| D445,650 S | | 7/2001 | Maxwell et al. |
| D449,495 S | | 10/2001 | Tucker et al. |
| 6,305,546 B1 | | 10/2001 | Saunders et al. |
| D450,537 S | | 11/2001 | Hayes |
| D450,983 S | | 11/2001 | Tucker et al. |
| 6,397,503 B1 | | 6/2002 | Cain et al. |
| 6,412,637 B1 | | 7/2002 | Saunders et al. |
| 6,523,286 B2 | * | 2/2003 | Leicher ..................... 40/311 |
| 6,564,934 B1 | * | 5/2003 | Dischler ..................... 206/219 |

* cited by examiner

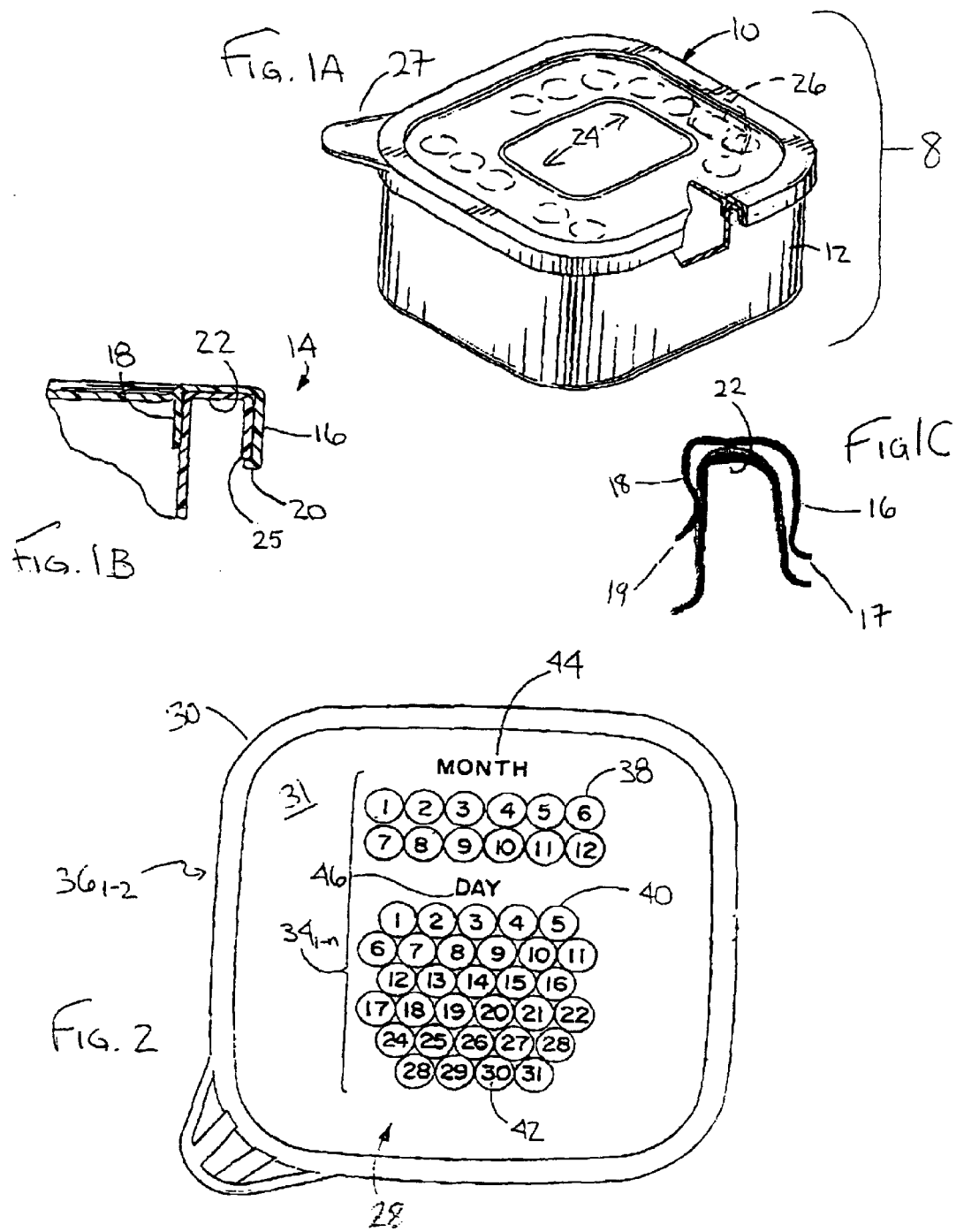

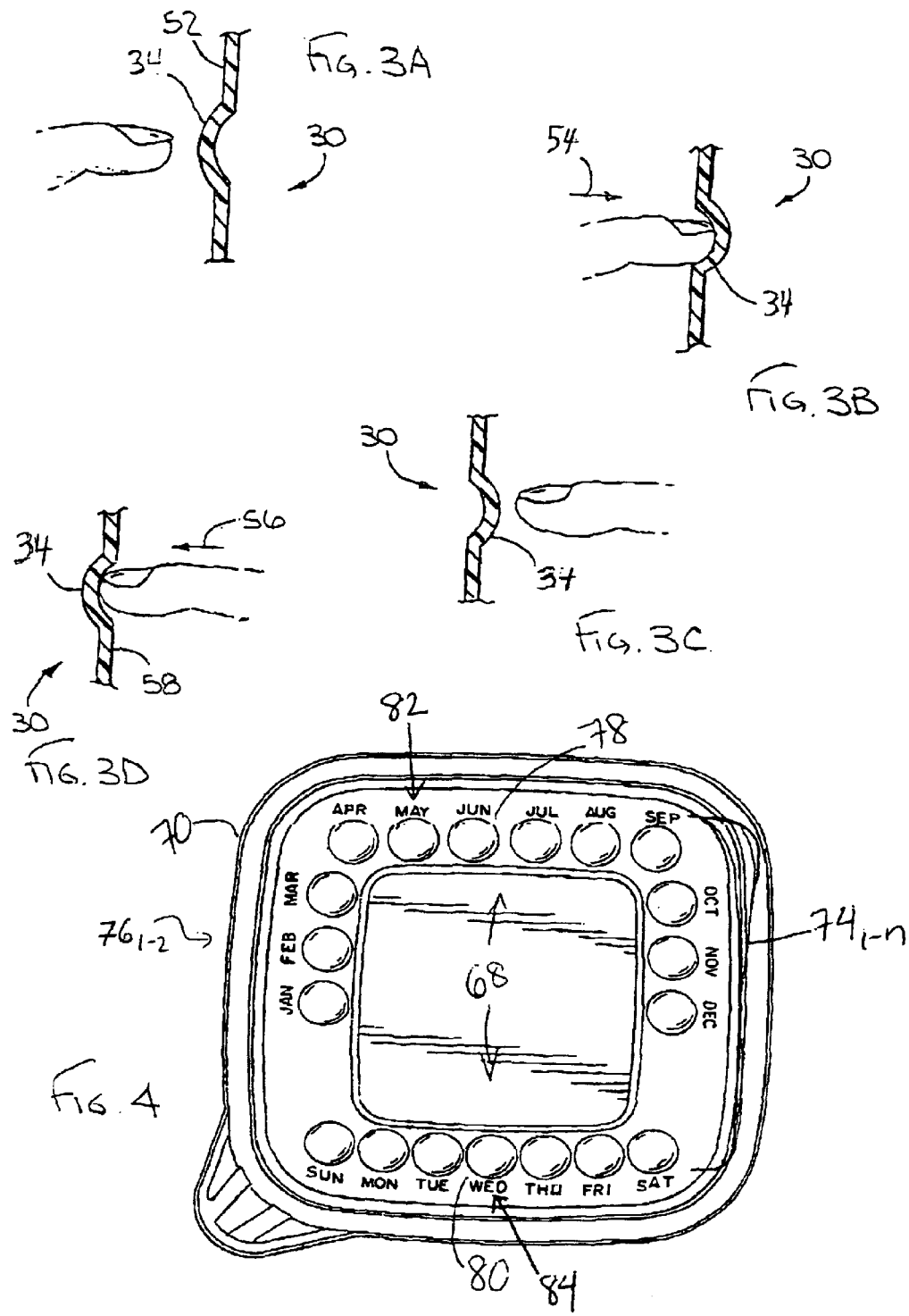

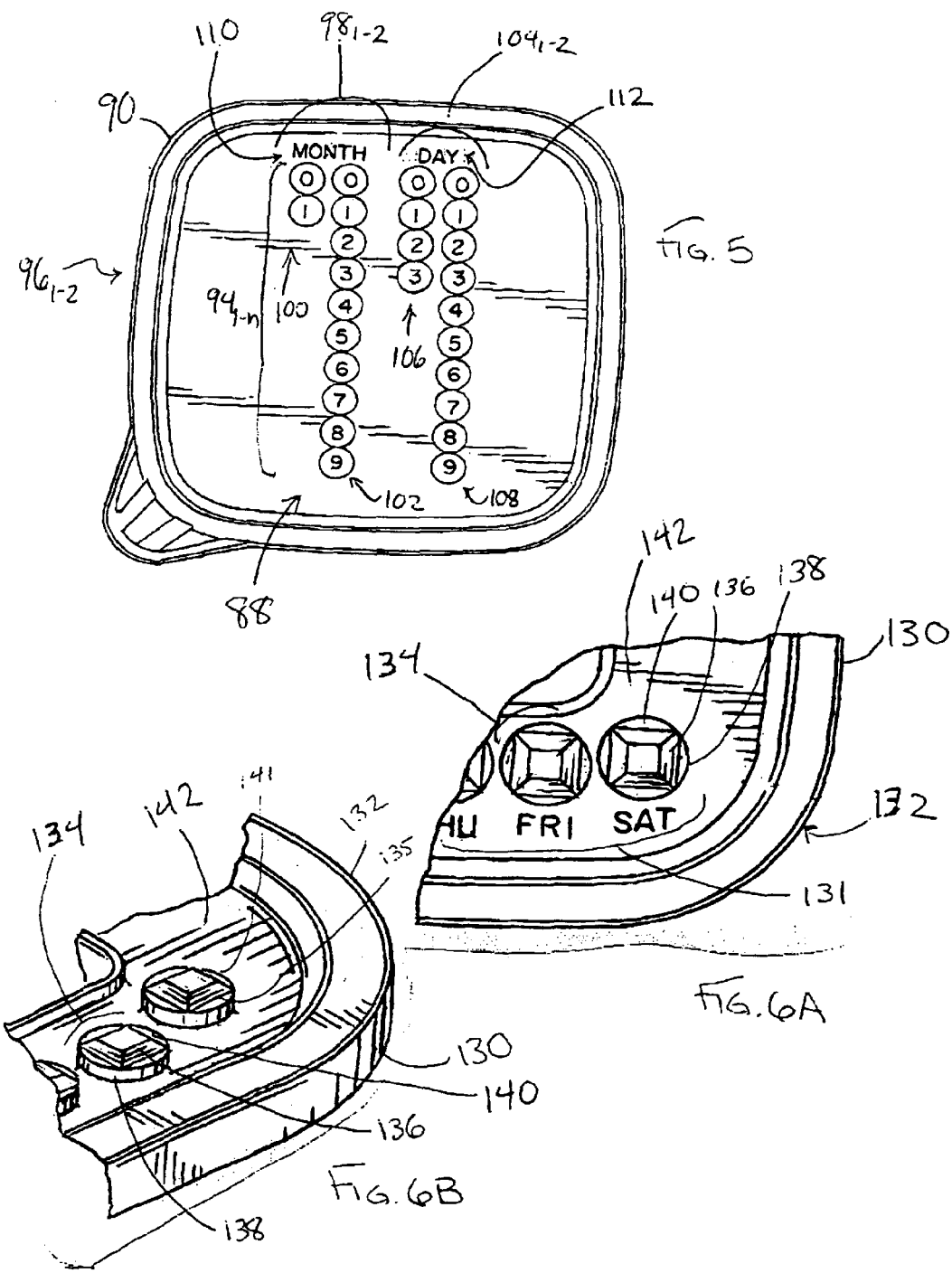

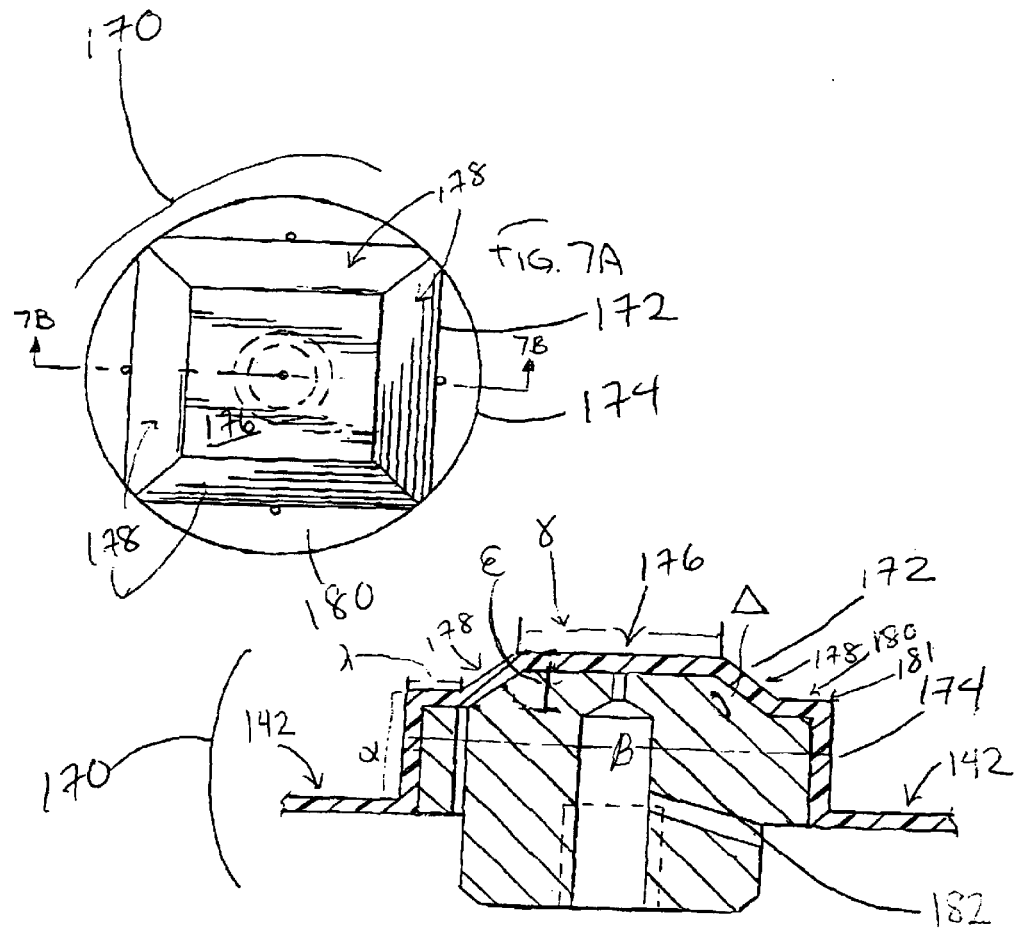
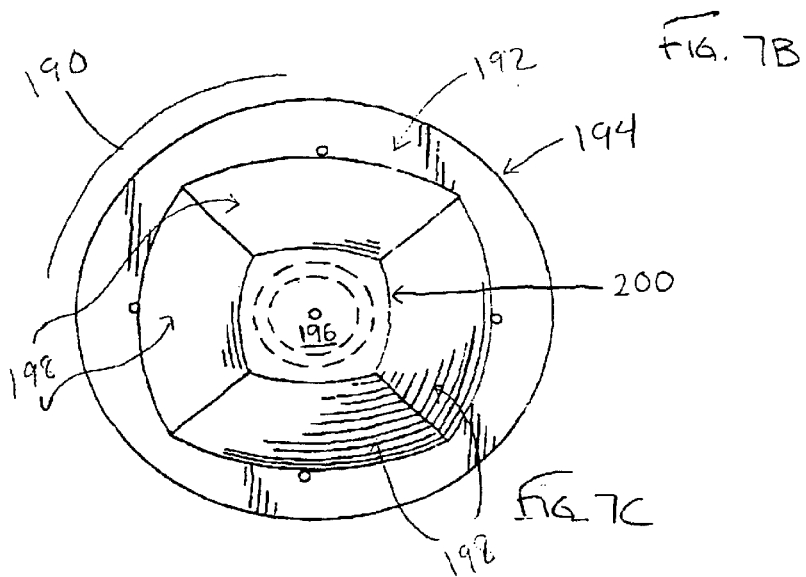

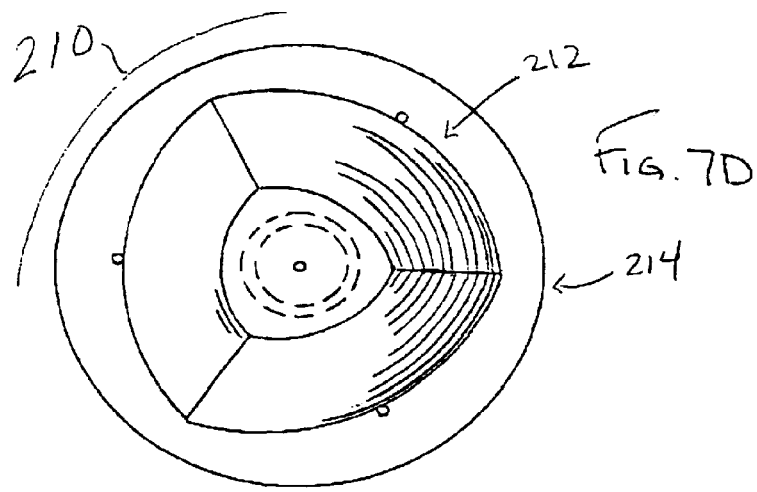
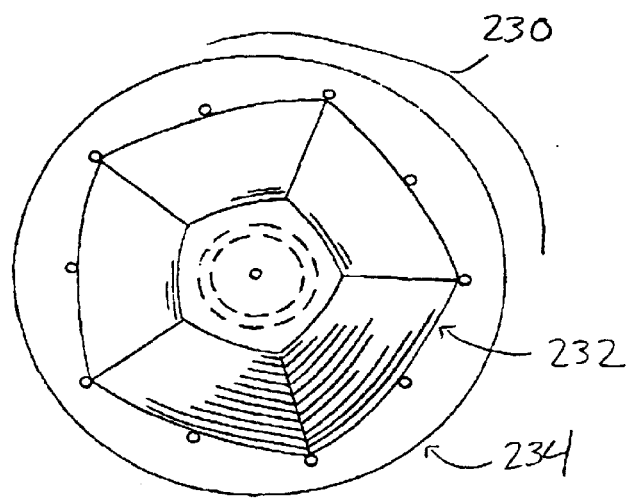
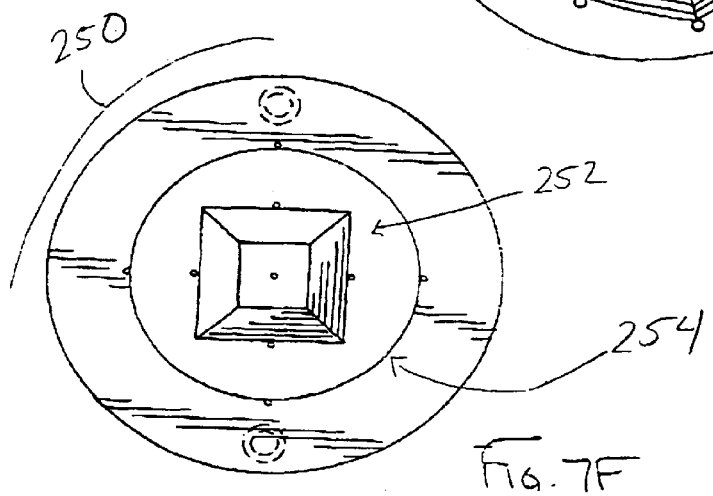

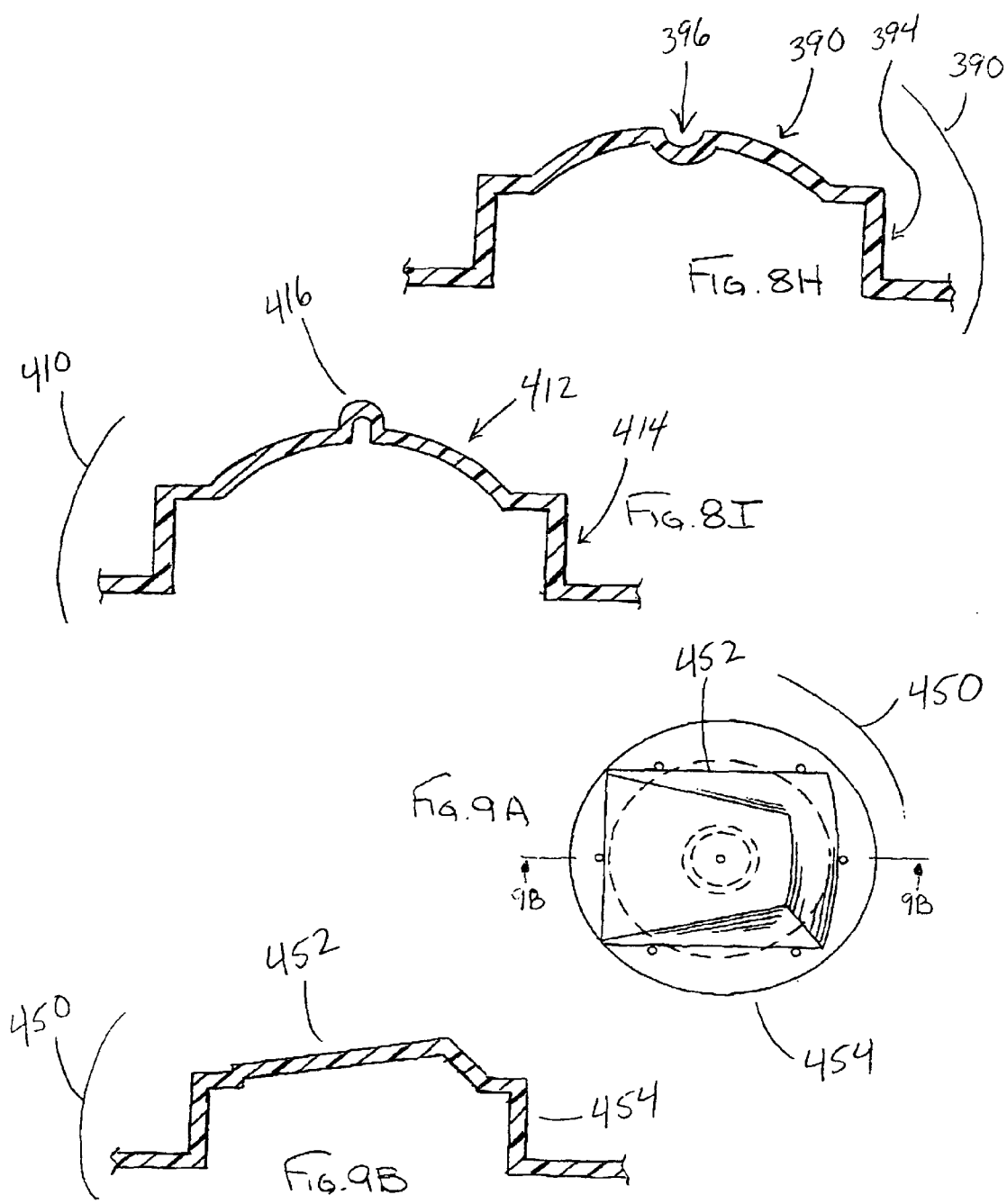

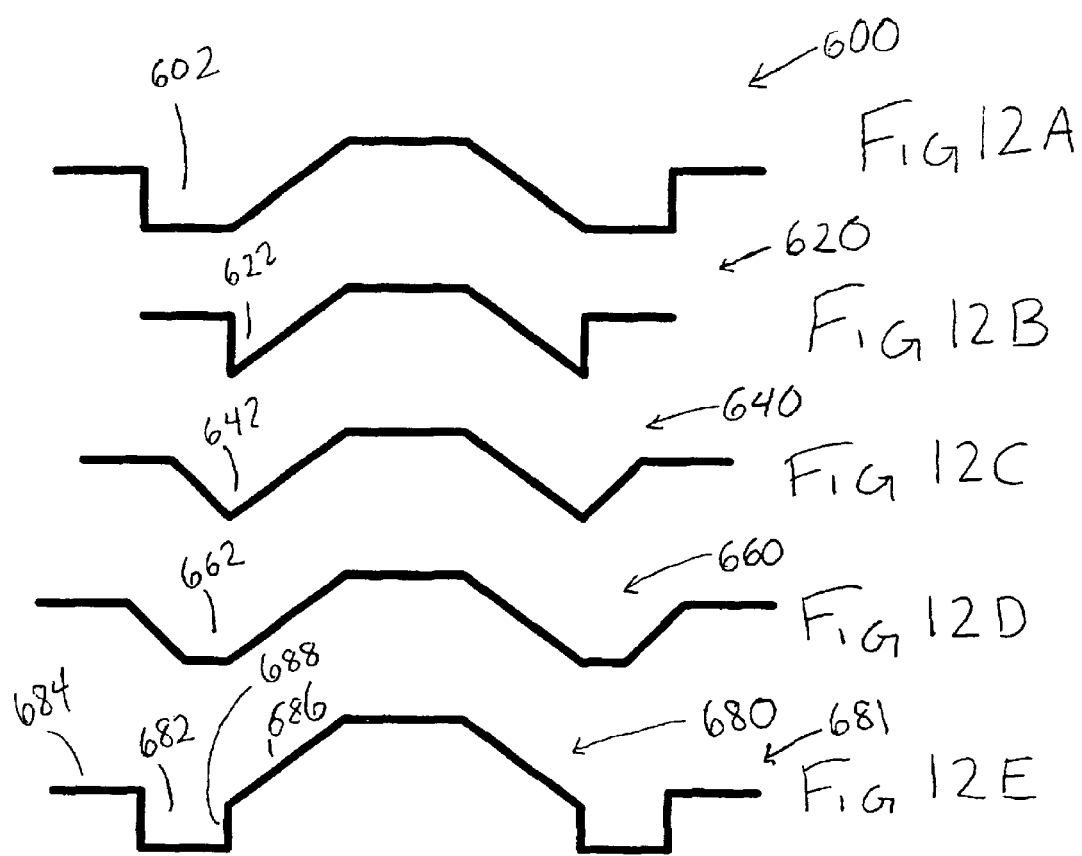

REUSABLE LID WITH DATE INDICATING DEVICE

CROSS-REFERENCE TO RELATED APPLICATION

This application is a continuation-in-part of U.S. patent application Ser. No. 09/277,270, filed Mar. 26, 1999, now abandoned.

FIELD OF THE DISCLOSURE

The disclosure generally relates to reusable containers and more particularly to reusable containers having a date indicating device which utilizes resettable buttons.

BACKGROUND OF THE DISCLOSURE

Reusable storage containers have been in use for many years and enable consumers to store leftovers and other food products. One problem associated with such storage containers is that it is difficult to keep track of the date when the food was stored in the container. Similarly, it is difficult to keep track of the date by which the food should be disposed.

Since most currently available food storage containers do not include any indicator to enable the user to mark the date when the food was placed in the container, quite often these containers are placed into the refrigerator or freezer without any date indication at all. This poses a serious health concern to the consuming public, as the FDA has shown that millions of Americans are stricken by illness every year caused by the food they consume and that approximately nine-thousand (9,000) people a year die of food poisoning By simply storing food in the food storage container without indicating the date on which the food was placed in the container, there is a possibility that the food in the container will go rancid prior to being consumed In the event that the food is not spoiled to the point that it is visibly noticeable to the consumer, there is a possibility that the consumer will eat the spoiled food and become sick and/or die of food poisoning. Consequently, there is a need for a device that will give consumers confidence when judging the freshness of foods stored in the refrigerator and freezer. Such a device would also eliminate a common situation that creates—guilt contemplating the disposal of food of uncertain age.

In an attempt to indicate the date upon which the food in a container was stored various companies offer "freezer tape," which is essentially tape upon which notes and other indicia can be written. This tape is placed on the lid of the food storage container and a storage date is written on the tape. However, this method is quite inconvenient, as the use of this product requires the consumer to apply the tape to the container (removing any old tape which remains from any previously stored food) and write the food storage date on the freezer tape itself. Further, this tape will only stick to a container that is dry and not very cold. Additionally, this handwritten date is often blurred and unreadable once exposed to frost or cold moist air. All these inconveniences add up to a system that is overly burdensome to use. As a result, such a system is unlikely to be used.

There have been other attempts to design an effective system for dating the contents of food and other containers. For example, Owens (U.S. Pat. No. 4,985,879), describes a container which indicates the date using arms reminiscent of a clock. Hornung (U.S. Pat. No. 6,000,159) describes a date using a device reminiscent of a car odometer. Designs such as those of Owens and Hornung are problematic in that the lid and date apparatus must be assembled from a number of different parts. Such assembly can significantly increase the cost of production. Such assemblies are also particularly ill-suited for a reusable container, because the parts can break or fall apart after repeated use of the container. What is needed is a simpler date indicating design that is easier to assemble, less expensive to produce, and less likely to become damaged.

The past is replete with the use of dimples or deformable surfaces for indicating the contents of disposable, fast food beverage lids. Examples include Wolf (U.S. Pat. No. 3,392,468) and Bartolucci (U.S. Patent No. 3,974,916). However, such dimples or buttons have not been used to indicate the date of a reusable container's contents. Moreover, such a use is by no means obvious. First, the beverage lids are disposable with the contents meant for immediate consumption, so there would be no need to indicate a date. Second, and more importantly, one of ordinary skill would not anticipate success in applying the art of disposable beverage lids to reusable containers and lids.

One would not anticipate success in applying the art of disposable beverage cups to reusable containers and lids on account of a great number of different factors. Some important factors are duration and repetition of use, number of buttons, the container's dimensions and material composition, and, finally, environmental stresses. These factors are all related and collectively influence the stability of date-indicating buttons. The first of these four factors is the most straightforward. A reusable container has to be very sturdy to stand up to repeated uses, and that is true even independent of such factors as material composition and environmental considerations, which are discussed below. The buttons on disposable beverage lids are generally for the immediate use of restaurants, which often have to dispense a lot of different beverages simultaneously to many different patrons. The buttons exist principally for the aid of the restaurant, and not the consumer. Consequently, the buttons on such disposable lids only need to remain stably inverted for a very brief period of time. And even if a single consumer has bought several different beverages, and so needs to tell them apart, such beverages will be consumed or dispensed to others in a very brief period of time.

The standard disposable beverage lid contains only four buttons, see, e.g., the Wolf and Bartolucci patents. Four buttons is usually not sufficient for indicating a date on a reusable food storage container. Simply adding more buttons for use in a reusable storage container using existing button designs is not feasible. Since the buttons are part of a common piece of plastic, the forces on one button are going to be shared to at least some extent by the other buttons. When there are many buttons on a single container or lid, the stresses can be enough to compromise button stability.

The plastics used in disposable beverage lids are generally different from those used in reusable containers and lids. The most common design found on thin thermoformed polystyrene beverage lids consists of a simple dome. Unfortunately, when such buttons are formed in the thicker polypropylene lids typically used for home (reusable) food storage containers, this design yields completely unsatisfactory results. Due to the higher overall stiffness and resilience of lids on home food storage containers, a button having a geometry akin to those on a disposable beverage lid will quickly and automatically pop back up to its original conformation.

Stiffness is one part of the problem because a stiffer material poses a greater resistance to inversion. Polystyrene (PS) has a higher intrinsic stiffness (elastic modulus) than polypropylene (PP), polyethylene (PE), or polypropylene/ polyethylene (PEP) copolymers, for example. Unfortunately, the thicker lid stock typically employed with the latter materials more than offsets the intrinsic advantage in flexibility since extrinsic stiffness (moment of inertia) increases in proportion to the cube of the thickness. Thermal sensitivity is another problem. The softening points of low density PE (LDPE), PS and polythethylene terepthalate (PET) are low for parts used in a microwave for example. PP and HDPE hold up better in the microwave but are generally stiffer than a PEP. Reducing flexural rigidity solely through a reselection of raw materials is therefore not a satisfactory solution. Nor is a reduction in thickness, because a certain amount of rigidity is necessary to connote a sense of lid security and to form satisfactory seals in the eyes of consumers.

Fina 6289MZ PP, being a random ethylene/propylene copolymer is one of the more flexible choices for a lid's raw material that does not excessively compromise thermal properties. Unfortunately, the exceptional resilience of PEP, a common plastic used in reusable containers, is another problem for attempting to translate beverage lid buttons to reusable storage containers and lids. A resilient material has a high level of elastic memory of its former conformation. Displacement of a button surface from its original position creates stresses which then act toward reverting the button after external forces are removed. In a brittle material like PS, which has a glass transition temperature above room temperature, the stresses experienced during a button inversion cause the material to fail on a microscopic scale. Very small fissures (crazing or stress-whitening) form in the surface. This relieves much of the stress, greatly reducing the restorative forces available for a reversion. A brittle material, while beneficial from this vantage point, would be unsuitable for a storage container used inside a freezer. A moderate impact would cause a cold container to shatter. Even more significant, crazing is an irreversible process, which can make PS unsuitable for use in a reusable container. While crazing may also affect buttons composed of other plastics, including PEP, the visual effects are reversible, and the physical effects are less severe.

A reusable storage container and lid, must withstand the heat of a microwave, the cold of a freezer/refrigerator, and the abuse of a dishwasher. The container must also have a balanced stiffness so that it may produce a good container seal and still permit inversion of buttons without too much difficulty. These requirements preclude simply selecting a particular type of plastic that would make pre-existing button designs functional on a reusable storage container. Since applying existing button designs to reusable containers and lids does not work, there is a pressing need for button designs that will be effective for use in reusable lids and containers.

SUMMARY OF THE DISCLOSURE

In accordance with one aspect of this disclosure, a reusable container lid is provided, which comprises buttons, platforms, a connector and indicia. There are a plurality of resettable buttons, which are used to indicate a date related to the contents of the container. Each button is situated atop its own platform. A connector is located along a perimeter of the container's lid, and is adopted to connect the lid to a container. Indicia are associated with each button indicating a parameter of the button.

In accordance with another aspect of the disclosure, a reusable container lid is provided, which comprises buttons, a connector, and indicia. A plurality of resettable buttons are used to indicate a date related to the contents of the container, and which are positioned such that their centers are less than 2 inches from one or more free edges. A connector is located along a perimeter of the container's lid, and is adopted to connect the lid to a container. Indicia are associated with each button indicating a parameter of the button, such that there is a button for each month of a year and each day of a week.

In accordance with another aspect of the disclosure, a reusable container lid is provided, which comprises buttons, a connector and indicia. A plurality of resettable buttons are used to indicate a date related to the contents of the container. A connector is located along a perimeter of the container's lid, and is adopted to connect the lid to a container. Indicia are associated with each button indicating a parameter of the button.

In accordance with another aspect of the disclosure, a method of storing items is provided, which comprises item placement, container closing, and button inversion. Items are first placed in a container, with the container then being closed in a substantially sealed arrangement. After that a button or buttons associated with the container are inverted so as to indicate one or more of the following: a date on which the items are placed in the container, a date when the items are to be used, a time of a day when the items are to be used, and a date by which the items are to be disposed of Finally, buttons are reverted to their original positions so that the container system may be reused.

In accordance with another aspect of the disclosure, a reusable storage container system is provided, which comprises a container lid, a container base, buttons, a connector and indicia. A lid fits on to the container base. A plurality of resettable buttons are used to indicate a date related to the contents of the container. A connector is located along a perimeter of the container's lid, and is adopted to connect the lid to a container. Indicia are associated with each button indicating a parameter of the button.

These and other aspects and features of the disclosure will become more readily understood by reference to the following detailed description when taken in conjunction with the accompanying drawings.

BRIEF DESCRIPTION OF THE DRAWINGS

FIG. 1A is a perspective view of a reusable container system including both lid and base with date indicating device according to the teachings of the disclosure;

FIG. 1B is an enlarged sectional view of a container base and lid interface;

FIG. 1C is an enlarged sectional view of another container base and lid interface;

FIG. 2 is a plan view of a reusable lid with date indicating device constructed in accordance with the teachings of this disclosure including a plurality of resettable buttons, where there is a button for each month of a year and each day of a month;

FIGS. 3A–3D are a series of side views illustrating the manner in which the plurality of resettable buttons can be set and/or reset;

FIG. 4 is a plan view of a second lid embodiment with date indicating device constructed in accordance with the teachings of the disclosure with a button for each month of the year, and each day of the week;

FIG. 5 is a plan view of a third lid embodiment with date indicating device constructed in accordance with the teachings of the disclosure including a plurality of resettable buttons, where there are buttons that can be used to indicate a month of a year, and a day of a month;

FIG. 6A is an enlarged, fragmentary plan view of a reusable lid with button assemblies;

FIG. 6B is a fragmentary, perspective view of the lid shown in FIG. 6B;

FIG. 7A is a plan view of a truncated pyramidal button assembly;

FIG. 7B is a sectional view of the button assembly of FIG. 7A taken along the line 7B–7B;

FIG. 7C is a plan view of a truncated pyramidal button assembly related to that of FIG. 7A;

FIG. 7D is a plan view of a truncated pyramidal button assembly related to that of FIG. 7A;

FIG. 7E is a plan view of a truncated pyramidal button assembly related to that of FIG. 7A;

FIG. 7F is a plan view of a truncated pyramidal button assembly related to that of FIG. 7A;

FIG. 8H is a sectional view of a circular dome button assembly related to that of FIG. 8B;

FIG. 8I is a sectional view of a circular dome button assembly related to that of FIG. 8B;

FIG. 9A is a plan view of a wedge-shaped button assembly;

FIG. 9B is a cross-sectional view of the wedge button assembly taken along line 9B—9B of FIG. 9A;

FIG. 12A shows a sectional view of a button assembly, similar to that in FIG. 7A, that includes a basin, but not a platform;

FIG. 12B shows a sectional view of another button assembly that includes a basin, but not a platform;

FIG. 12C shows a sectional view of another button assembly that includes a basin, but not a platform;

FIG. 12D shows a sectional view of another button assembly that includes a basin, but not a platform; and FIG. 12E shows a sectional view of another button assembly that includes a basin and a platform.

Figure 8A:
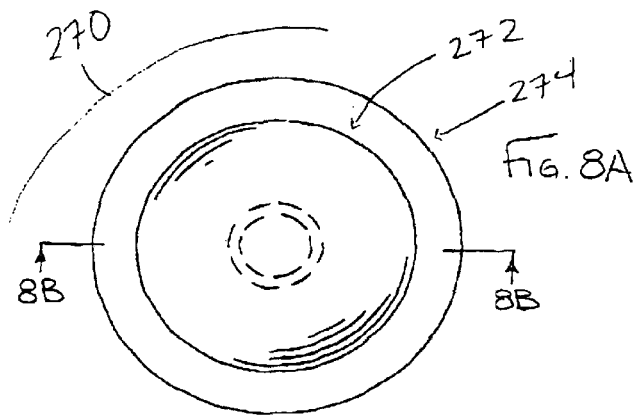
FIG. 8A is a plan view of a circular dome button assembly.
Figure 8B:
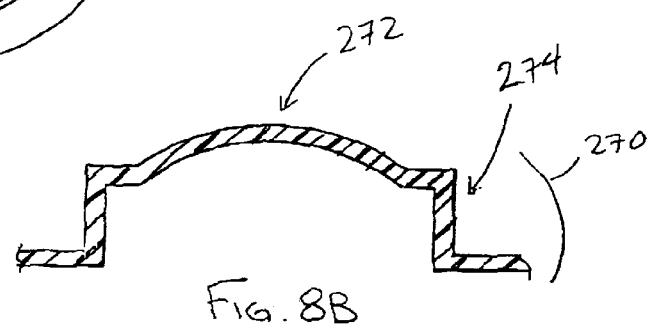
FIG. 8B is a sectional view of the button assembly of FIG. 8A taken along the line 8B–8B.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is cover all modifications, alternative constructions, and equivalents falling within the spirit and scope of the disclosure as defined by the appended claims.

DETAILED DESCRIPTION

Referring now to the drawings, and with specific reference to FIG. 1A, a food storage container system constructed in accordance with the teachings of the disclosure is generally referred to be reference number 8. As shown in FIGS. 1A, 1B, and 1C, the container system 8 may include a reusable lid 10 removably attached to a container base 12. The lid 10 maybe attached to the base 12 by a mechanism 14. The mechanism 14 may include a pair of downwardly extending radial flanges 16 and 18. One of these flanges may include a barb 20 so that when flanges 16 and 18 are slid over rolled lip 22 of container base 12, barb 20 slides under the lower edge 25 of rolled lip 22. This process, in turn, would effectively connect and seal lid 10 to container base 12. Alternatively, or in connection therewith, a hinge device 26 may be included to hingedly attach lid 10 to container base 12. A handle 27 may be included to aid removal or opening of lid 10 from container base 12. FIG. 1C is an example of another mechanism 14 by which lid 10 may be attached to base 12. In FIG. 1C, radial flanges 16 and 18 have flared ends 17 and 19. The flanges 16 and 18, and flared ends 17 and 19, are shaped so as to frictionally interfit with, and lock on to, the over rolled lip 22 of the container base 12. FIGS. 1A, 1B and 1C are provided by way of example only. Other container systems are certainly possible including, but not limited to, such shapes as cylindrical tubes, casserole pans, and the like.

Reusable lid 10 includes a resettable date indicating device 24 for indicating a date associated with the contents of the container. This date would typically be the date when the stored item was placed into the container, enabling the user to determine how long the item has been stored. However, this date need not be the date the item was stored in the container, it could be the date by which the item in the container is to be disposed, or when the contents are supposed to be used. Moreover, other parameters associated with the contents such as, but not limited to, the type of item or item stored could be indicated in lieu of or in addition to a date.

One embodiment has a date indicating device 28, as shown in FIG. 2, on the reusable lid 30, which includes a plurality of resettable, indentable two-position buttons $34_{1-n}$. In the normal position, these buttons appear on the lid surface as raised bumps. However, the user can apply a downward force to thus indent and thereby change the button state from its normal convex shape to a concave shape. This process is shown in greater detail in FIGS. 3A–3D, and is discussed below.

The plurality of resettable, indentable buttons $34_{1-n}$ may be arranged into a plurality of groups $36_{1-2}$, where each group indicates a portion of the date. Since the date contains a month portion and a day portion, the plurality of groups $36_{1-2}$ includes a first group 38 for indicating the month portion of the date and second group 40 for indicating the day portion of the date. For example, if the food stored in the container was stored on May 26; in group 38, the user would indent button 5 (which indicates May) and, in group 40, the user would indent button 26 (which indicates the $26^{th}$ day). While, in this particular example, the plurality of groups $36_{1-2}$ is shown to contain only two date groups 38 and 40, this is for illustrative purposes only, as the date indicating device can contain any number of groups. For example, additional groups can be added or substituted, which correspond to: the year portion of the date; whether the date refers to a date of storage or a date by which contents should be disposed, or date of intended use; a meal (e.g. breakfast, lunch, dinner); a time of day; a name of a storer or an intended user; a nutritional parameter (e.g. low sodium; no sugar; gluten-free) a type of food stored in the container (e.g. poultry, beef, fish, liquid); etc. Groups for lid 30 and other lids may also be omitted.

Each of the plurality of resettable, indentable buttons $34_{1-n}$ has visual indicia 42 for indicating at least a portion of the date. For example, the indicators in the second group 40, namely those which indicate the day portion of the date, would have indicia in the form of numerals 1–31 printed on or around each of the plurality $34_{1-n}$ of resettable, indentable buttons. While FIG. 2 shows the indicia printed directly on the buttons, this is for illustrative purposes only, as the indicia could be printed next to the buttons. Additionally, group indicia 44 and 46 can be used to indicate the title or type of group 38 and 40, respectively.

The location of the particularly effective embodiment or otherwise be associated with buttons $34_{1-n}$ on the lid's 30 surface 31 is for illustrative purposes only in FIG. 2. However, the inventors have found that the buttons $34_{1-n}$ perform particularly well when located within two inches of the lid's outer perimeter 35. In another embodiment, the buttons $34_{1-n}$ are located within one inch of he lid's outer perimeter. One of skill in the art will appreciate that this disclosure encompasses a wide variety of different date indicating button configurations, some of which appear below. One will also appreciate that the buttons may be located on the container base 12 instead of the container lid 10.

During use of the reusable lid 30 for a food storage container, each resettable, indentable button 34, FIG. 3A, initially has a convex shape protruding above a front surface 52 of the reusable lid 30. When the user applies an inward force (indicated by arrow 54), FIG. 3B, onto the surface 52 of the reusable lid 30, the button is inverted into a concave shape. When the user wishes to reset or revert now-concave button 34, FIG. 3C, an outward force (as indicated by outward force 56), FIG. 3D, is applied to a backside 58 of the reusable lid so that button 34 is reverted or restored to its original convex shape. All buttons of the disclosure are indentable and resettable, regardless of whether or not a button is expressly described as being so. One skilled in the art will understand that not all of the surface of a button will necessarily invert when the button is inverted. The disclosure also includes buttons that are initially, i.e. before inversion, oriented downward or toward the center of the container, and are inverted by pushing the button outward. Such buttons would technically rest below, instead of atop, a platform if there are platforms present in the button assembly. Platforms and button assemblies are described with references to FIGS. 6–10. The conformation of a platform may also be altered upon inverting or reverting a button.

The force used to invert the button 34 is referred to as the inversion force, whereas the force used to revert the button 34 is referred to as the reversion force. When reference is made to either an inversion or a reversion force, reference is being made to a peak force value on a force vs. deflection curve. The inversion force may vary for the button 34, in that each time the button 34 is inverted, after reversion, the exact inversion force may vary. Furthermore the length of time a button 34 has remained in its non-inverted state may effect the actual inversion force required to invert the button 34. FIG. 11, shows inversion forces for three different buttons of button assemblies A, B and C, respectively. Each button was inverted three times on each of two separate days, the days being spaced four days apart. On each of the two days, the button was inverted and then reverted three times, for a total of three inversion/reversion cycles or just cycles. These three cycles were spaced somewhat less than one minute apart. One will notice that the first inversion force on any given day was greater than the subsequent two inversions. One will also note that inversion force increased between the last cycle of the first day and the first cycle of the second day. The data shown in FIG. 11 is for illustrative purposes only, and does not describe the force characteristics of all buttons. The button assemblies A, B and C represented in FIG. 11 correspond to a variant on the concave button assembly in FIG. 8G, another variant on the concave button assembly in FIG. 8G, and a variant on the truncated ogival pyramid in FIGS. 10A and 10B, respectively.

A second embodiment for a date indicating device 68 may be provided on a lid 70 as depicted in FIG. 4, where the mechanics of the buttons function in the fashion described relative to the buttons of lid 30 in FIGS. 2 and 3. The plurality of resettable, indentable buttons $74_{1-n}$ are arranged into a plurality of groups $76_{1-2}$, where either group can indicate a date. The plurality of groups $76_{1-2}$ includes a first group 78 for indicating a month corresponding to the date and second group 80 for indicating a day of a week corresponding to the date. For example, if the item stored in the container was stored in May; in group 78, the user would indent the button with the "MAY" indicia 82. In another example, if the item stored in the container was stored on a Wednesday, in group 80, the user would indent the button with the "WED" indicia 84. While, in this particular example, the months of a year and days of a week are indicated with the three-letter abbreviations shown, other abbreviations or symbols can also be shown. Additionally, the location of the indicia may vary as was discussed above for lid 30. While, in this particular example, the plurality of groups $76_{1-2}$ is shown to contain only two date groups 78 and 80, this is for illustrative purposes only, as the date indicating device can contain any number of groups, as was discussed above for lid 30 shown in FIG. 2. One particular interesting variant of date indicating device 68 and lid 70, is one that just has buttons corresponding to the days of a week, and not months of a year. Another embodiment could just have buttons representing months of a year.

A third embodiment has a date indicating device 88 that may be provided on a reusable lid 90, as shown in FIG. 5. There are a plurality of resettable, indentable two-position position buttons $94_{1-n}$, where the mechanics of the buttons function in the fashion described for the buttons of lid 30 in FIGS. 2 and 3. The date indicating device 88 is a variation on the date indicating device 28 in the sense that both indicate a month and a day corresponding to the contents of a container.

The plurality of resettable, indentable buttons $94_{1-n}$ are arranged into a plurality of groups $96_{1-2}$, where each group indicates a portion of a date. The date contains a month portion and a day portion, and the plurality of groups $96_{1-2}$ includes a first group $98_{1-2}$ for indicating the month portion of the date and second group $104_{1-2}$ for indicating the day portion of the date. The first group $98_{1-2}$ contains two subgroups: 100 and 102. Subgroup 100 indicates the first digit of the month, while subgroup 102 indicates the second digit of the month. The second group $104_{1-2}$ contains two subgroups: 106 and 108. Subgroup 106 indicates the first digit of the day, while subgroup 108 indicates the second digit of the day. In one example, if the item stored in the container was stored on May 26, the user would first indent button 0 in subgroup 100, and then the user would indent button 5 in subgroup 102. After that the user would indent button 2 in subgroup 106, and finally, the user would indent button 6 in subgroup 108. As was similarly discussed above for the other date indicating designs, various groups and subgroups may be substituted for, or added to, those shown on lid 90. Groups and subgroups may also be omitted. As was also discussed above for the other date indicator designs, indicia for each button may appear either on or alongside each button, and the actual indicia chosen may vary, depending on the group or subgroup present. Furthermore, group indicia 110 and 112 can be used to indicate the title or type of groups $98_{1-2}$ and $104_{1-2}$, and the placement of these group indicia may also vary.

In FIGS. 6A and 6B, a lid 130 is provided that is similar to, but more detailed than that shown in FIG. 4. The corner of the lid 130 is shown in both a plan view in FIG. 6A and in a perspective view in FIG. 6B. The corner of the lid 130 that is shown reveals all or part of three button assemblies 131 located along the lid's 130 outer perimeter 132. Each button assembly 134 may comprise both a button 136 and a platform 138. A top part of the platform 138 that surrounds the base 135 of the button 136 is termed the platform ledge, or just ledge 140. As demonstrated below, the ledge 140 can also include such features as ridges and troughs as well as the principally horizontal portions. Button assemblies can lack a ledge 140.

For illustrative purposes only, the button 136 has the general shape of a truncated square pyramid, but other geometries, some of which are discussed below, are also contemplated. Additionally, for illustrative purposes only, the platform 138 has the general shape of a cylinder, but other geometries including, but not limited, to those having the general shape of a prism, a truncated pyramid and a truncated cone are encompassed within the disclosure. The disclosure also encompasses lids and container systems where the buttons and platforms in any given embodiment can have different shapes and dimensions.

Referring again to FIG. 6B, the platform 138 can be seen to rise above a principal plane 142 of the platform 138. The platform 138 serves a number of different functions. The platform 138 can facilitate depression of the button 136, and can help the button remain inverted after release. The platform 138 can accomplish the former by decreasing the inversion force, and the latter by increasing the reversion force. The platform 138 also serves to isolate the button 136 from other buttons, so that the forces affecting one button are not shared as much by other buttons as in the absence of a platform 138.

With reference to FIG. 7A, a plan view of a button assembly 170, similar to the button assembly 134 shown in FIGS. 6A and 6B, is provided that comprises a resettable indentable button 172 that sits atop a platform 174. The button 172 is in the shape of a truncated square pyramid, but other shapes are also envisioned including prisms, domes, truncated pyramids and truncated cones, some of which are described below. While the comers of the base of the pyramid shown are cut-off, other variations may retain their corns. The truncated square pyramid consists of a plateau 176 and sides 178. While the button is shown in this and other figures sitting atop a platform, the disclosure also comprises assemblies where the platform 174 is absent. The platform 174, when present, may take on a number of different geometries and dimensions as discussed above with reference to FIGS. 6A and 6B. The top surface of the platform that surrounds the button is termed a platform ledge 180. The surface and underside of the button 172 and platform 174 are continuous with each other, as they are with the rest of the lid. A sectional view of the button assembly 170 appears in FIG. 7B. The button 172 dimensions may vary, including width, height and the angle of the sides 178 from a horizontal axis. The width and height ranges were described above in relation to FIG. 6. In one embodiment, the button 170 includes sides 178 forming an angle Δ relative to a horizontal axis of between 25 and 80 degrees, with the button 172 including sides forming an angle relative to a horizontal axis of between 30 and 40 degrees being found to be particularly effective. In another embodiment, the sides 178 of the button 172 have angles relative to a horizontal axis that are not all equal to one another.

In FIG. 7B, the button assembly 170 is shown positioned on a mold 182 used to form it. The mold 182 would be used in a thermoforming process of manufacture, and mold 182 is an example of a "male" mold, but one of skill will understand that a "female" mold corresponding to the negative of the mold 182 could also be used. Additionally, one of skill in the art will appreciate that any number and combination of different techniques may be used to manufacture said buttons. These techniques include, but are not limited to: injection molding, cold forming processes, heat-stamping, ultrasonic tooling and laser ablation. One skilled in the art will also understand that how exactly the plastic is formed will vary depending on how the overall lid and container mold(s) is shaped.

However, when using the mold 182, a sheet of plastic, such as any of the below-mentioned is pulled or "drawn" over the mold 182 to form the button assembly. More specifically, the sheet of plastic is heated so as to be malleable, and thus assume the shape of the mold 182 when draped thereover. The mold 182 may be provided with a vacuum to facilitate the drawing process, and may include cooling conduits to facilitate setting or curing of the polymer. The drawn area is that area of the button assembly 170 that undergoes thinning during contact with the mold. The draw ratio is the ratio of the original thickness of the plastic to its thickness after being molded. The draw ratio may be expressed as an average value or the value at a particular point. The portion of the plastic that first contacts the mold experiences little or no draw, and so retains approximately its original thickness. Consequently, the drawn surface area of a button assembly would not include the area of a plateau such as plateau 176, assuming the plateau 176 experiences no draw. The total button assembly surface area includes the area of the button assembly including both the drawn area and any area not drawn. The inverting button assembly surface area includes that area that is inverted when a button is inverted. "Projected" areas corresponding to either drawn, total or inverted surface areas, correspond to the area of those respective areas projected onto a plane in which the button assembly sits, i.e. the principal plane of the lid 142.

In one embodiment, the lid 130 includes an average thickness of between 15 and 30 mils, a maximum thickness in the range of 15 to 32 mils, and a minimum thickness in the range of 8–25 mils. A mil is defined as one-thousandth of an inch. In another embodiment, the buttons and nearby outlying areas, including their platforms if present, have wall sections below the average lid thickness. In another embodiment, the draw ratios of the thinnest areas have a draw ratio greater than 1.2. In another embodiment, the ratio of drawn button assembly surface area to drawn button assembly projected drawn area is greater than 1.2. In another embodiment, the ratio of the total button assembly area to total button assembly projected area is greater than 1.05. In another embodiment, the ratio of the total button assembly area to total button assembly projected area is greater than 1.1. In another embodiment, the button assemblies have a total button assembly inverting area to projected button assembly inverting area of between 1.13 and 1.3. In yet another embodiment, the cold-formed, hot-stamped, ultrasonically treated, or laser ablated button assemblies are formed in such a way that the perimeter of each button where flexing is required for an inversion, is preferentially thinned during the forming process or as a post-processing step. The aforementioned parameters may be applied to all button assemblies in this disclosure.

In one embodiment, the platform 174 is between 0.1 and 1 inches in width β, see FIG. 7B, at its widest point, with a width of between 0.450 and 0.9 being found to be particularly effective. In one embodiment, the platform 174 is between 0.005 and 0.5 inches in height α, see FIG. 7B, with a height of between 0.050 and 0.150 inches being found to be particularly effective. In one embodiment, the platform's ledge 180 is between 0.000 and 0.250 inches in width λ at its widest point, with a width of between 0.040 and 0.200 inches being found to be particularly effective. The width λ of the platform ledge 180 is defined as the distance between the base of the button 172 and the outer perimeter 181 of the ledge 180. In one embodiment, the button 172 has a base width γ between 0.1 and 0.5 inches, with a base width of between 0.275 and 0.5 inches being found to be particularly effective. In another embodiment, the button 172 has a height ε between 0.025 and 0.250 inches, with a height between 0.050 and 0.125 inches being found to be particularly effective. Other button dimension ranges are also contemplated, but the above ranges can be applied to all buttons in this disclosure.

The disclosure also encompasses a button assembly 134 that lacks a platform 138. The disclosure also encompasses a button assembly 134 that has a platform 138, but lacks a platform ledge 140. In such a button assembly, the button covers the entire top of the platform. In one embodiment, the platform 138 and non-inverting portion of each button 136 has a height between 15% and 300% of the height of the inverting portion of the button, and the platform width between 100%–300% of the width of the button's base 135. Additionally, the entire button assembly 134, or parts thereof, may have a texture or a coating applied to them. The aforementioned parameters can be applied to all the button assemblies in this disclosure.

FIGS. 6A, 6B, 7A and 7B have been used to describe the features of button assemblies generally, and one of skill in the art will understand the utility of referring to one figure over another in discussing a particular detail, and the use of different reference numbers to refer to the same kind of detail.

With reference to FIG. 7C, a truncated pyramidal button assembly 190 is shown, which is a variant of button assembly 170. The button assembly 190, including the button 192 and platform 194 (if present), may vary in dimensions and properties as was described for button assembly 170. The button 192 sits on a platform 194. Of particular notice is the arced or curvilinear nature of the edges 200 of the plateau 196 and the sides 198 of the button 192 defined by them. This configuration serves to illustrate that a side of a truncated pyramidal button of this disclosure need not be restrained to a single plane. One of skill may also recognize that the sides 198 and plateau 196 of the button may take on a number of different configurations beyond those illustrated in FIG. 7C and the other figures of this specification. One of skill in the art will also recognize that with its curved sides 198 and plateau 196, the button 192 begins to approximate a truncated cone, a button geometry which is also the subject of the disclosure.

With reference to FIG. 7D, a button assembly 210 is shown, which is a variant of button assembly 170. The button assembly 210, including the button 212 and option platform 214 (if present), may vary in dimensions and properties as was described for button assembly 170. Button 212 of button assembly 210 has the general shape of a truncated triangular pyramid, and also can be seen as an approximation of a truncated cone as described for button 190.

With reference to FIG. 7E, a button assembly 230 is shown, which is a variant of button assembly 170. The button assembly 230, including the button 232 and platform 234 (if present), may vary in dimensions and properties as was described for button assembly 170. Button 232 of button assembly 230 has the general shape of a truncated pentagonal pyramid, and also can be seen as an approximation of a truncated cone as described for button 170 and 190.

With reference to FIG. 7F, a button assembly 250 is shown, which is a variant of button assembly 170. Button assembly 250 is an illustration of a 170 variation where the button 252 is relatively small in proportion to the platform 254. The button 252 also retains all of its corners unlike the button 172 shown in FIG. 7A.

With reference to FIG. 8A, a plan view of button assembly 270 comprising a resettable, indentable button 272 that sits atop a platform 274 is provided. The button 272 is in the shape of a round dome. While the button is shown in this and other figures sitting atop a platform, the disclosure also comprises assemblies where the platform 274 is absent. The surface and underside of the button and the platform are continuous with each other, as they are with the rest of the lid. A sectional view of button assembly 270 appears in FIG. 8B. The button 272 is in the shape of a round dome, whose circular and spherical radii may vary. The circular radius is equal to one half the base width described above in association with FIG. 6. Variations in button and platform width and height are possible as described in association with FIG. 6B. The button 272 is a section of a sphere. The spherical radius is defined as the distance from the center of the hypothetical sphere to its perimeter. In one embodiment, the spherical radius is between 0.050 and 0.750 inches, with a spherical radius between 0.150 and 0.500 inches being found to be particularly effective.

Figure 8C:
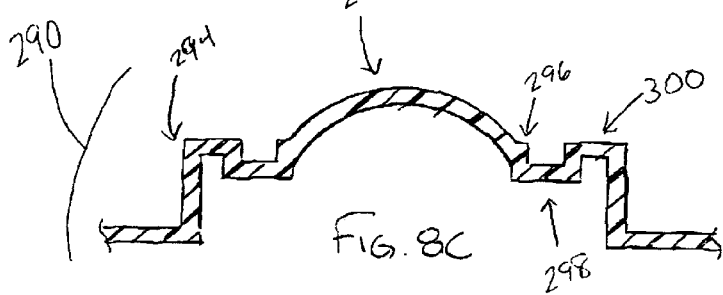
FIG. 8C is a sectional view of a circular dome button assembly related to that of FIG. 8B.

With reference to FIG. 8C, a sectional view of a button assembly 290 comprising a button 292 that sits atop a platform 294 is provided. The button assembly 290 is a variation on that of 270, which adds the additional feature of a rectangular trough 298 as part of the platform 296, so that there is formed both an inner platform ledge 296 and an outer platform ledge 300. In one variation, not illustrated, the inner ledge may take the form of a circular ridge with a radius of curvature of, for example, 0.010 inches.

Figure 8D:
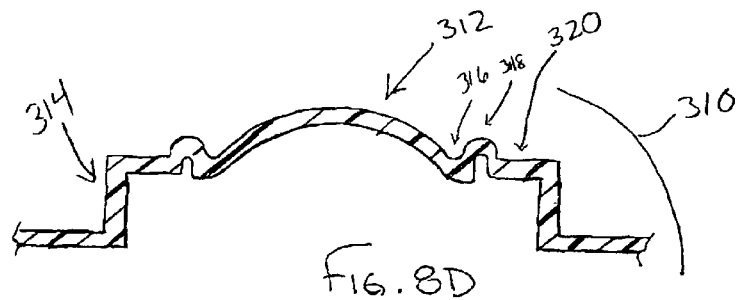
FIG. 8D is a sectional view of a circular dome button assembly related to that of FIG. 8B.

With reference to FIG. 8D, a sectional view of a button assembly 310, comprising a button 312 that sits atop a platform 314 is provided. The button assembly 310 is a variation on that of 270, which adds the additional features of both an inner circular trough 316, a circular ridge 318, and an outer ledge 320.

Figure 8E:
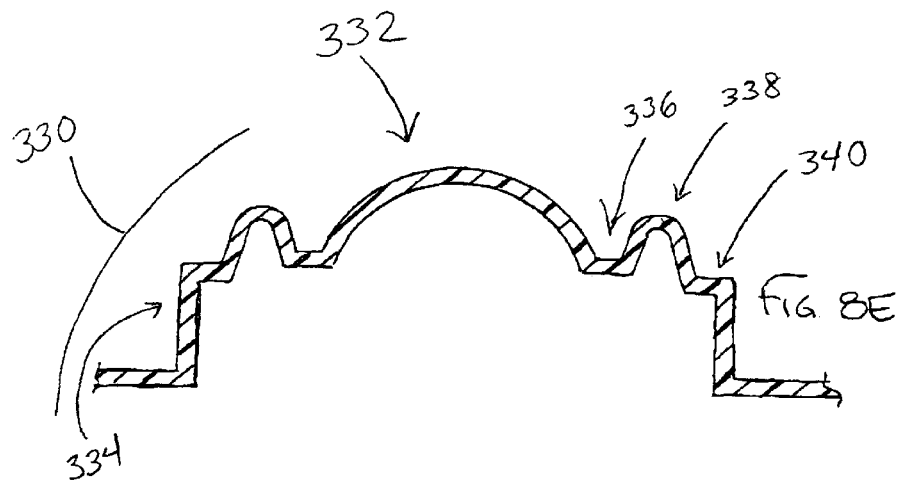
FIG. 8E is a sectional view of a circular dome button assembly related to that of FIG. 8B.

With reference to FIG. 8E, a sectional view of a button assembly 330 comprising a button 332 that sits atop a platform 334 is provided. The button assembly 330 is a variation on that of 270, which adds the additional features of an high inner platform ledge 336, a circular ridge 338, and a lower outer platform ledge 340.

Figure 8F:
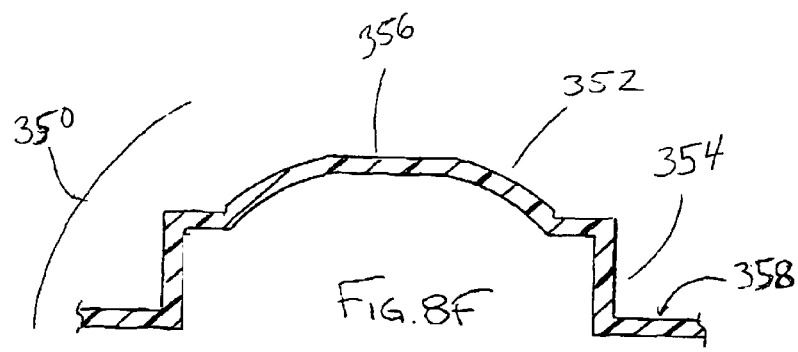
FIG. 8F is a sectional view of a circular dome button assembly related to that of FIG. 8B.

With reference to FIG. 8F, a sectional view of a button assembly 350, comprising a button 352 that sits atop a platform 354 is provided. The button assembly 350 is a variation on that of 270, which adds the additional feature of a plateau 356 on the dome of the button 352 to yield the form of a truncated dome. While the plateau 356 lies in a plane parallel to that of the principal plane of the lid 358, the disclosure also encompasses buttons with truncation planes that are not parallel.

Figure 8G:
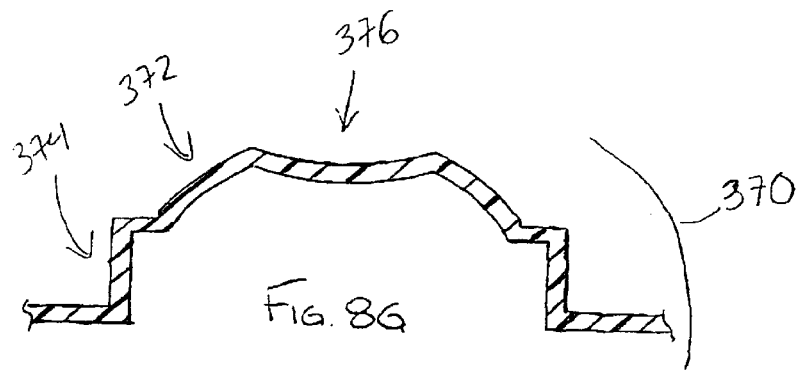
FIG. 8G is a sectional view of a circular dome button assembly related to that of FIG. 8B.

With reference to FIG. 8G, a sectional view of a button assembly 370, comprising a button 372 that sits atop a platform 374 is provided. The button assembly 370 is a variation on that of 270, which adds the feature of a concave depression 376 on the dome of the button 372. While the concave depression 376 is directly centered on the button 372 in button assembly 370, other variants are envisioned in which it is not. Depressions such as 376 may appear on buttons of different shapes, including, but not limited to, truncated pyramids and truncated cones.

With reference to FIG. 8H, a sectional view of a button assembly 390, comprising a button 392 that sits atop a platform 394 is provided. The button assembly 390 is a variation on that of 270, which adds the feature of a cleft 396 on the face of the button 392. Button assembly 390 shows just one variation on a cleft button, other variations are envisioned where the number of clefts varies, as may their placement. A cleft such as 396 may also appear on buttons of different shapes. The cleft 396 may be particularly effective in allowing button 392 to invert and retain an inverted shape.

With reference to FIG. 8I, a sectional view of a button assembly 410, comprising a button 412 that sits atop a platform 414 is provided. The button assembly 410 is a variation on that of 270, which adds the feature of a ridge 416 on the surface of the button 412. The inner and outer surface of the ridge is continuous with that of the rest of the button, i.e. the ridge 416 does not form a bubble or form a completely enclosed space between itself and the rest of the button 412. In other words, the entire button 412, ridge 416 included, is part of a continuous sheet of plastic. The button assembly 390 shows just one variation on a ridge button, other variations are envisioned where the number of ridges varies, as may their placement. The ridge 416 may also appear on buttons of different shapes. Similar to the cleft embodiment, the ridge 416 may facilitate inversion and shape retention.

This disclosure also encompasses variations and combinations based on the button assemblies of FIGS. 8H and 8I. For example, there may be buttons that include both one or more ridges and one or more cleft. In another embodiment, the ridges and/or clefts may intersect with one another on a particular button.

With reference to FIG. 9A, a plan view of a button assembly 450 comprising a button 452 that sits atop a platform 454 is provided. The button 452 has the general shape of a wedge, reminiscent of a computer keyboard key. A sectional view of button assembly 450 appears in FIG. 9B. The wedge-shaped button 452 shown in FIGS. 9A and 9B is for illustrative purposes only, variations of the wedge button assembly 450 with different angles and curvatures are also contemplated.

Figure 10A:
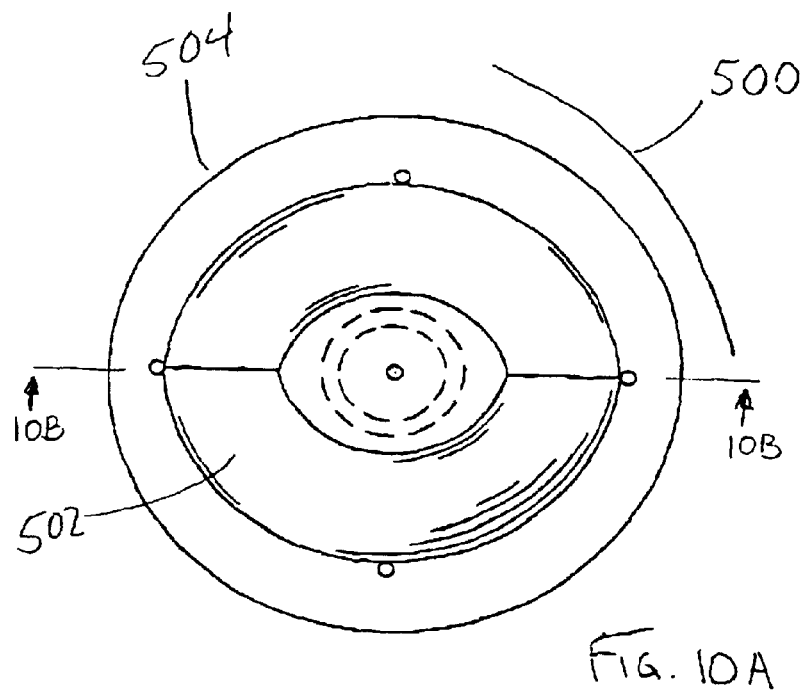
FIG. 10A is a plan view of a truncated cone button assembly, and more specifically a truncated ogival cone button assembly.
Figure 10B:
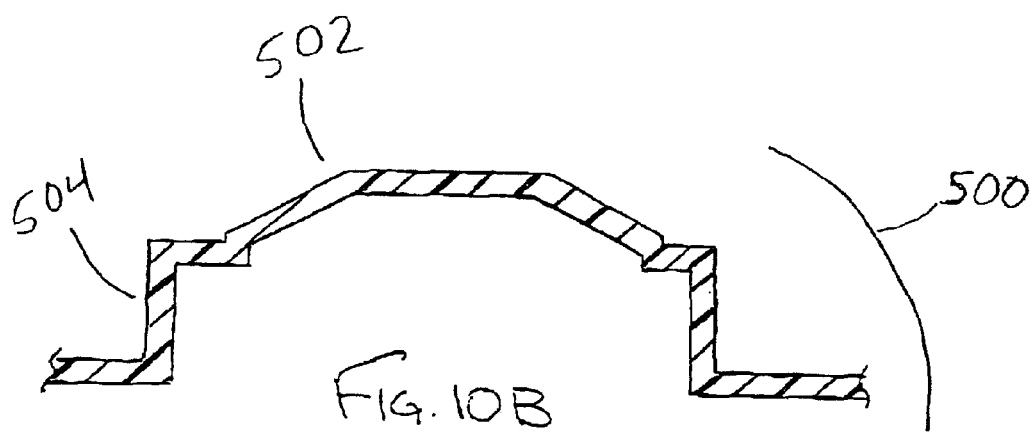
FIG. 10B is a sectional view of the truncated cone button assembly of FIG. 10A, taken along line 10B—10B of FIG. 10A.
Figure 11:
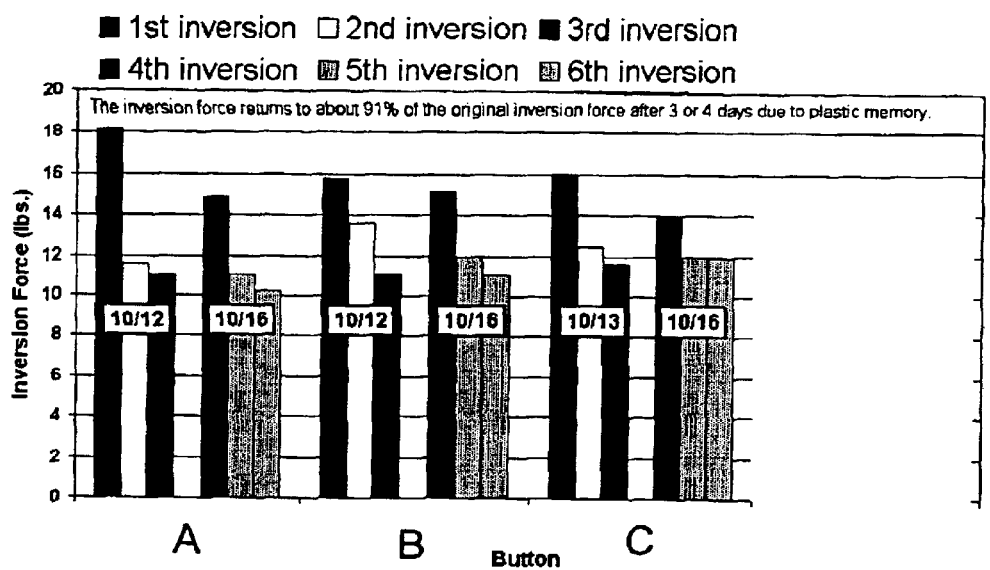
FIG. 11 shows an inversion force recovery diagram.

With reference to FIG. 10A, a plan view of a button assembly 500 comprising a button 502 that sits atop a platform 504 is provided. The button 502 has the general shape of a truncated ogival cone. A sectional view of button assembly 500 appears in FIG. 10B. The particular truncated conical button 502 shown in FIGS. 10A and 10B is for illustrative purposes only, variations including, but not limited to, buttons having the general shapes of truncated circular cones and truncated elliptical cones are also contemplated.

The button assembly 134 shown in FIGS. 6A and 6B rest on the principal plane 142 of the lid 130. However, the button assembly 680, as shown in FIG. 12E, may also include a basin 682 that extends below the surface or principal plane 684 of the lid 681. The platform 688 rests in the basin 682 with button 686 sitting atop the platform 688. The shape of the basin 682, and well as the shapes of the button 686 and the platform 688, are for illustrative purposes only, and different shapes for the respective parts are also within the scope of the disclosure. The button assembly 680 is a sectional view of a button assembly similar to that shown in FIG. 7A, except button assembly 680 includes a basin 682. The button assembly 680 lacks a ledge 180 as was shown for button assembly 170, but that is for illustrative purposes only, and other embodiments of a button assembly 680 resting in a basin 682 that do have a ledge akin to ledge 180 are within the scope of the disclosure.

Button assemblies that lack platforms, but which include basins are also contemplated. One embodiment of such a button assembly is button assembly 600 in FIG. 12A. Button assembly 600 sits in a basin 602. Other embodiments of button assemblies include button assemblies 620, 640 and 660, which are shown in FIGS. 12B, 12C and 12D, respectively. These button assemblies 600, 620, 640 and 660 vary in the shape and dimensions of their respective basins: 602, 622, 642 and 662. The button assemblies shown are for illustrative purposes only. The button assemblies in FIGS. 12A–12E may be incorporated into date indicating devices, as can all the other various button assemblies described in this disclosure.

The container system 8 enables the user to indicate on the lid 10 a date associated with the items being stored (e.g. the date the food was stored). Since the buttons are individually settable and resettable, the system can be reused by the user indefinitely. The reusable lid can be constructed of any resilient material, such as plastic or rubber. In one embodiment, the lid is made from at least one material from the list consisting of polypropylene, polyethylene, polypropylene/polyethylene copolymer, polyethylene terephthalate, and polystyrene. An elastomer may also be used such as thermoplastic polyolefin (TPO). The rest of the container system may be made from similar materials. In one particularly effective embodiment, the lid is made of 98% Fina Polypropylene 6289 MZ and 2% colorant.

Within the scope of this disclosure are reusable container systems with date indicating devices that may or may not be stacked on one another. The container systems may be shaped in such a way that the container systems may be stacked on top of one another whether or not the date indicating devise is being used. Container systems may be also be shaped in such a way that they be stacked with container systems that lack a date indicating device.

Although specific features are shown in some drawings and not others, this is for convenience only as each feature may be combined with any or all of the other features in accordance with the disclosure. Moreover, while not specifically referenced with regard to each embodiment discussed above, it is to be understood that the foregoing shapes and dimensions while not all inclusive, do represent embodiments providing advantageous durability, shape retention, inversion ability and reusability.

This disclosure also encompasses a method of using a either a lid or complete container system that includes a date indicating device as described above. Specifically, this method of storing items comprises: placing items in a container, closing the container in a substantially sealed arrangement; and inverting a button associated with the container. The buttons of this method may have indicia associated with them related to one or more of the following: a date on which the items are placed in the container, a date when the items are to be used, a time of a day when the items are to be used, and a date by which the items are to be disposed. In one embodiment, the method involves a button positioned on a lid closing the container. In another embodiment, the method involves buttons with indicia for each month of a year, and each day of a week. In another embodiment, the method involves buttons with indicia for each day of a week. In another embodiment, the method involves buttons with indicia for each month of a year, and each day of a month. In another embodiment, the method involves a button with the general shape of a round dome. In another embodiment the method involves a button with the general shape of a truncated pyramid. In another embodiment the method involves a button further including a recessed trough about the perimeter of the button. In another embodiment, the method involves a button that includes a ridge about the perimeter of the button. In another embodiment, the method involves a button with one or more of the following features: a ridge, a cleft, a plateau and a depression. In still another embodiment, the method involves a button that is positioned on a platform extending from the lid. In another embodiment, the method involves a button that includes the steps of reverting the button and reusing the container.

From the forgoing, one of ordinary skill in the art will appreciate that the disclosure teaches a reusable container system having a date indicating device with improved ease of use, durability, and simplicity.

What is claimed is:

1. A reusable container having a base and a lid, the lid comprising:

a plurality of resettable buttons, each button situated atop an individual platform and having the shape of a truncated pyramid, each individual platform extending above a horizontal plane of the lid, each button extending above the individual platform upon which the button is situated;

a connector along a perimeter of the lid, adapted to connect the lid to the base; and indicia associated with each button indicating a parameter of the button a date related to contents of the container.

2. The lid of claim 1, wherein the plurality of resettable buttons includes a button for each month of a year and each day of a month.

3. The lid of claim 1, wherein the platform is cylindrical in shape.

4. The lid of claim 1, wherein the platform is prismoidal in shape.

5. The lid of claim 1, wherein the platform is between 0.1 and 1 inches at its widest point.

6. The lid of claim 1, wherein the platform is between 0.005 and 0.5 inches in height.

7. The lid of claim 1, wherein the buttons are inverted downwardly.

8. The lid of claim 1, wherein the plurality of resettable buttons includes a button for each month of a year and each day of a week.

9. The lid of claim 1, wherein the plurality of resettable buttons includes a button for each day of a week.

10. The lid of claim 1, wherein the plurality of resettable buttons includes a pair of buttons for a first digit of a month of a year, numbered zero and one, a set of ten buttons for a second digit of the month of the year, numbered zero through nine, a set of buttons for a first digit of a day of the month, numbered zero through three, and a set of buttons for a second digit of the day of the month, numbered zero through nine.

11. The lid of claim 1, wherein the plurality of resettable buttons are positioned less than 1 inch from one or more free edges of the lid.

12. The lid of claim 1, wherein the platforms are of different shapes.

13. The lid of claim 1, wherein the platforms are cylindrical in shape.

14. The lid of claim 1, wherein the platforms are prismoidal in shape.

15. The lid of claim 1, wherein the platforms are the shape of a truncated cone.

16. The lid of claim 1, wherein the platforms are between 0.1 and 1 inches in width.

17. The lid of claim 1, wherein the platforms are between 0.450 and 0.9 inches in width.

18. The lid of claim 1, wherein the platforms are between 0.005 and 0.5 inches in height.

19. The lid of claim 1, wherein the platforms are between 0.050 and 0.150 inches in height.

20. The lid of claim 1, wherein the platforms include ledges between 0.000 and 0.250 inches wide.

21. The lid of claim 1, wherein the buttons have a base width between 0.1 and 0.5 inches.

22. The lid of claim 1, wherein the buttons have a base width between 0.275 and 0.5 inches.

23. The lid of claim 1, wherein the buttons have a height between 0.025 and 0.250 inches.

24. The lid of claim 1, wherein the buttons have a height between 0.050 and 0.125.

25. The lid of claim 1, wherein each button includes a plateau.

26. The lid of claim 1, wherein the platforms include a rectangular trough.

27. The lid of claim 1, wherein the platforms include both a circular trough, and a circular ridge.

28. The lid of claim 1, wherein the platforms include both a planar section, and ridge with a circular apex.

29. The lid of claim 1, wherein the sides of the buttons have angles relative to a horizontal axis that are all equal to one another.

30. The lid of claim 1, wherein the sides of the buttons have angles relative to a horizontal axis that are not all equal to one another.

31. The lid of claim 1, wherein each button has the shape of a truncated square pyramid.

32. The lid of claim 31, wherein the buttons include sides forming an angle relative to a horizontal axis of between 25 and 80 degrees.

33. The lid of claim 31, wherein the buttons include sides forming an angle relative to a horizontal axis of between 30 and 40 degrees.

34. The lid of claim 31, wherein the sides of the buttons have angles relative to a horizontal axis that are not all equal to one another.

35. The lid of claim 1, wherein each button includes a cleft.

36. The lid of claim 1, wherein each button has a ridge.

37. The lid of claim 1, wherein the platform and non-inverting portion of each button has a height between 15% and 300% of the height of the inverting portion of the button, and the platform's width is between 100%–300% of the width of the button's base.

38. The lid of claim 1, wherein the lid includes an average thickness of between 15 and 30 mils.

39. The lid of claim 1, wherein the lid has a maximum thickness in the range of 15 to 32 mils, and a minimum thickness in the range of 8 to 25 mils.

40. The lid of claim 1, wherein the button assemblies have wall sections below an average lid thickness.

41. The lid of claim 40, wherein the draw ratios of the thinnest areas have a draw ratio greater than 1.2.

42. The lid of claim 40, wherein the ratio of drawn button assembly surface area to button assembly projected drawn area is greater than 1.2.

43. The lid of claim 40, wherein the ratio of the total button assembly area to total button assembly projected area is greater than 1.1.

44. The lid of claim 1, wherein the button assemblies have a total button assembly inverting area to projected button assembly inverting area of between 1.13 and 1.3.

45. The lid of claim 1, wherein the cold-formed, hot-stamped, ultrasonically treated, or laser ablated button assemblies are formed in such a way that the perimeter of each button where flexing is required for an inversion is thinned.

46. The lid of claim 1, wherein the lid is made of 98% Fina polypropylene and 2% colorant.

47. The lid of claim 1, wherein the lid is made from at least one material from the list consisting of polypropylene, polyethylene, polypropylene/polyethylene copolymer, polyethylene terephthalate, polystyrene and elastomers.

48. A reusable container having a base and a lid, the lid comprising:

a plurality of resettable buttons, each button being positioned less than 2 inches from one or more free edges of the lid, a button for each month of a year and each day of a week being provided, each button having the shape of a truncated pyramid, each button being situated atop and extending above an individual platform extending above a horizontal plane of the lid;

a connector along a perimeter of the lid adapted to connect the lid to the base; and indicia associated with each button indicating a date related to contents of the container.

* * * * *

UNITED STATES PATENT AND TRADEMARK OFFICE
CERTIFICATE OF CORRECTION

| | |
|---|---|
| PATENT NO. | : 6,938,768 B2 |
| APPLICATION NO. | : 10/159917 |
| DATED | : September 6, 2005 |
| INVENTOR(S) | : Bruno R. Ferretti and Lawrence C. Stanos |

It is certified that error appears in the above-identified patent and that said Letters Patent is hereby corrected as shown below:

Column 15: Line 53-54, delete "a parameter of the button"

Signed and Sealed this

Twenty-second Day of July, 2008

JON W. DUDAS
*Director of the United States Patent and Trademark Office*